United States Patent

Nishimura et al.

[11] Patent Number: 5,957,235
[45] Date of Patent: Sep. 28, 1999

[54] TRAVELING DRIVE APPARATUS IN A WORKING VEHICLE

[75] Inventors: Satoru Nishimura; Hikosaburō Hiraki; Hiroyuki Inoue, all of Ishikawa-ken, Japan

[73] Assignee: Komatsu Ltd., Tokyo, Japan

[21] Appl. No.: 08/700,479

[22] PCT Filed: Mar. 7, 1995

[86] PCT No.: PCT/JP95/00371

§ 371 Date: Sep. 6, 1996

§ 102(e) Date: Sep. 6, 1996

[87] PCT Pub. No.: WO95/24325

PCT Pub. Date: Sep. 14, 1995

[30] Foreign Application Priority Data

Mar. 7, 1994 [JP] Japan .................................. 6-035687

[51] Int. Cl.$^6$ ................................................. B60K 17/356
[52] U.S. Cl. ........................................... 180/306; 180/308
[58] Field of Search .................................. 180/305, 306, 180/307, 308, 165; 475/1, 2

[56] References Cited

U.S. PATENT DOCUMENTS

| | | | |
|---|---|---|---|
| 3,690,398 | 9/1972 | Hause | 180/305 |
| 3,844,368 | 10/1974 | Melli | 180/305 |
| 3,921,746 | 11/1975 | Lewus | 180/165 |
| 3,954,026 | 5/1976 | Rittmann et al. | 74/784 |
| 3,980,152 | 9/1976 | Manor | 180/165 |
| 4,020,917 | 5/1977 | Lutterschmidt | 180/308 |
| 4,023,641 | 5/1977 | Ganoung | 180/307 |
| 4,063,608 | 12/1977 | Sullivan | 180/308 |
| 4,161,992 | 7/1979 | Abels et al. | 180/306 |
| 4,340,126 | 7/1982 | Larson | 180/305 |
| 4,903,792 | 2/1990 | Ze-ying | 180/308 |
| 4,955,451 | 9/1990 | Schaefer | 180/305 |
| 5,039,129 | 8/1991 | Balmer | 180/308 |
| 5,405,028 | 4/1995 | Kaspar | 180/306 |
| 5,472,062 | 12/1995 | Nagai et al. | 180/308 |
| 5,590,898 | 1/1997 | Williams et al. | 280/707 |

FOREIGN PATENT DOCUMENTS

| | | |
|---|---|---|
| 58-70550 | 5/1983 | Japan . |
| 62-137129 | 8/1987 | Japan . |
| 5-54042 | 7/1993 | Japan . |
| 5-54043 | 7/1993 | Japan . |

*Primary Examiner*—Lanna Mai
*Assistant Examiner*—Avraham H. Lerner
*Attorney, Agent, or Firm*—Armstrong, Westerman, Hattori, McLeland & Naughton

[57] ABSTRACT

There is provided a traveling drive apparatus in a working vehicle having a traveling body with front wheels and rear wheels which are adapted to be controlledly driven respectively, characterized in that: the traveling body has mounted thereon an engine, a transmission and a hydraulic pump which are coupled to the engine and a first hydraulic motor that is adapted to be driven by the hydraulic pump whereas a left hand side wheel and a right hand side wheel on one of a front side and a rear side of the traveling body are adapted to be selectively coupled to either of an output side of the engine and an output side of the first hydraulic motor; and a left hand side wheel and a right hand side wheel of the other of the front side and the rear side are mounted on a suspension unit having a second hydraulic motor and a third hydraulic motor which are provided independently of each other and are adapted to be driven by the hydraulic pump and which are respectively coupled to the left hand side wheel and the right hand wheel of the other of the front side and the rear side of the traveling body.

13 Claims, 12 Drawing Sheets

TRAVELING DRIVE APPARATUS IN A WORKING VEHICLE

TECHNICAL FIELD

The present invention relates to a working vehicle in which a working machine such as an excavator or a crane is mounted on a traveling body thereof. More particularly, the invention relates to a traveling drive apparatus in a working vehicle that is made capable of traveling in a four wheel drive mode with a pair of front wheels and a pair of rear wheels.

BACKGROUND ART

Heretofore, as a working vehicle of this sort there has been known a type in which the respective drive shafts are provided for the front wheels and the rear wheels and in which each of the drive shafts is coupled to a transmission via a differential gear, a propeller shaft and a clutch.

There has also been known another type of such a vehicle in which for each wheel a respective hub has a hydraulic motor directly attached thereto so that the wheels may be driven independently of one another.

In the former type of the above mentioned prior art, it is now found that the need for all the wheels, particularly for the front wheels to be coupled in a mechanical construction has made a power transmission device unduly bulky and complicated in construction and further has imposed a limitation in its cost reduction. Also, in such a design, though an engine is mounted on a traveling body, the bulkiness of the power transmission device as mentioned above has made it a hindrance, thus reducing the degree of freedom of the range in which the engine is disposed and resulting in a poor equipment capability about the engine itself. Further, in this conventional technology, owing to the fact the left hand side wheel and the right side wheel on the front side are designed to be driven with a common drive shaft, it have been impossible for a difference to be given between the left hand side and right hand side with respect to the rate of rotation and the torque thereof, so that only a poor ability for the vehicle to travel may then ensue on a soft and weak site and on an unleveled ground.

On the other hand, in the latter type of the above mentioned prior art, it has now been found that the structure in which all the wheels are driven in a hydraulic mechanism makes it inevitable for its traveling efficiency to be lowered because of those characteristics that are inherent in any hydraulic motor. Also, in such a design in which the hydraulic circuit used for the vehicle to travel is naturally constructed of a closed circuit, it has been made effectively impractical for this hydraulic circuit to be coupled to a hydraulic circuit for a working machine and, as a result, the requirement for a respective hydraulic pump as for each of a hydraulic circuit for the vehicle body to travel and a hydraulic circuit for the working machine to be operated has made the entire hydraulic arrangement quite large scaled.

It should also be noted at this point that in the former type of the above mentioned prior art, even if the input shaft of the transmission is arranged so as to be driven by a hydraulic motor, it is found that since such a hydraulic motor has to be driven with a closed circuit, in this design, too, a hydraulic circuit for the vehicle body to travel and a hydraulic circuit for the working machine to be operated have had to be provided in their whole construction separately entirely from each other.

The present invention has been made to obviate the above mentioned inconveniences in the prior art and has for its object to provide a traveling drive apparatus in a working vehicle, which is made capable of effecting the simplification of a power transmission device therein, capable of reducing the speed ratios of the vehicle in a transmission therein, capable of reducing the cost involved in the said power transmission device as well as in the said transmission, capable of increasing the degree of freedom of the range in which an engine mounted at the lower side of a traveling body for the said vehicle is disposed, capable of enhancing the ability of the said vehicle to travel on a soft and weak ground site as well as on an unleveled or unprepared ground, capable of effecting the simplification of a hydraulic circuit arrangement in its construction and further capable of protecting, from an obstacle on the road on which the vehicle is traveling, hydraulic motors provided for independently driving the vehicle wheels.

SUMMARY OF THE INVENTION

In order to achieve the object mentioned above, there is provided in accordance with the present invention, in a preferred form of embodiment thereof, a traveling drive apparatus in a working vehicle having a traveling body with front wheels and rear wheels which are adapted to be controlledly driven respectively, characterized in that:

the said traveling body has mounted thereon an engine, a transmission and a hydraulic pump which are coupled to the said engine and a first hydraulic motor that is adapted to be driven by the said hydraulic pump whereas a left hand side wheel and a right hand side wheel on one of a front side and a rear side of the said traveling body are adapted to be selectively coupled to either of an output side of the said engine and an output side of the said first hydraulic motor; and a left hand side wheel and a right hand side wheel of the other of the said front side and the said rear side are mounted on a suspension unit having a second hydraulic motor and a third hydraulic motor which are provided independently of each other and are adapted to be driven by the said hydraulic pump and which are respectively coupled to said left hand side wheel and the said right hand wheel of the said other of the said front side and the said rear side of the said traveling body.

According to the construction mentioned above in which either of a pair (set) of the wheels on the front side and a pair (set) of the wheels on the rear side selectively driven by both the driving of the said engine and the said hydraulic motor whereas the other pair (set) of the wheels are drives by the respective hydraulic motors which are provided independently of each other for the said left had side and the right hand side, it can be seen that a power transmission device will be simplified in structure and reduced in cost, as compared with the construction in the prior art in which all of the wheels are mechanically coupled with a transmission.

Also, according to the inventive arrangement in which the engine and the hydraulic motors mentioned above can selectively be combined in their driving operations, it can be seen that it will be possible to shift a speed ratio and thus lessen the speed ratios of the transmission provided around the power transmission device for the said engine, thereby largely reducing the cost involved in the said transmission.

Also, by virtue of the inventive construction in which the wheels either on the front side or on the rear side is driven by one of a pair of hydraulic motors which are provided independently of each other for the left hand side and the right hand side, it can be seen that the construction that constitutes a power transmission device therefor will be made compact. As a result, the space in which the engine is mounted on the traveling body will be widened, thereby increasing the degree of freedom of the range in which the said engine is disposed while improving the capability to maintain the said engine drastically.

Also, it can be seen that the inventive construction in which the left hand side and right hand side wheels on the front side are driven by hydraulic motors which are provided independently of each other will enable the rates of rotation and the torques of the left hand side and right hand side wheels on the front side to be respectively varied, thus improving the ability for the traveling body to travel on a soft and weak ground as well as on an unleveled or unprepared ground.

It should be noted at this point that in the construction mentioned above, it is preferred that the said suspension unit for the said left hand side wheel and the said right hand side wheel of the said other of the said front side and the said rear side should be provided with a clutch for connecting and disconnecting them with the said second hydraulic motor and third hydraulic motors, respectively.

Further, in addition to the construction mentioned above, it may be desirable that the said working machine should be mounted on the said traveling body; and that the said hydraulic pump should have an intake side that is connected to a tank side and has a discharge side circuit that is connected to each of the said hydraulic motors as well as to a plurality of actuators for the said working machine in parallel to one another via an operating valve means.

According to the construction just mentioned above in which a hydraulic circuit for a driving arrangement by the said hydraulic pump and the said hydraulic motors is used as a hydraulic circuit for the said working machine, it can be seen that only a single hydraulic pump may sufficiently be provided whereas only a single principal hydraulic circuit may sufficiently be provided to simplify the hydraulic circuit arrangement required.

In the construction mentioned above, it is preferable that the said first hydraulic motor and the said second and third hydraulic motors should be connected in parallel to one another with a discharge side circuit of the said hydraulic pump via an operating valve means.

Further, in addition to the construction mentioned above, it may be desirable that the said suspension unit for the said left hand side wheel and the said right hand side wheel on the said front side should have the said second hydraulic motor and the said third hydraulic motor which are respectively provided independently of each other; and that each of the said second and third hydraulic motors should be disposed in the interior of a steering knuckle arm of a said suspension arm.

According to the construction just mentioned above, it can be seen that the fact that the said hydraulic motors for driving the right hand side and left hand side wheels on the front side independently of each other are disposed in the interior of the said steering knuckle arm will effectively protect those hydraulic motors from an earth, sand and rock discharge from the road on which the vehicle is traveling.

It should be noted at this point that it may be desirable that the said second and third hydraulic motors should be constructed integrally with a spindle which is securely fastened to a said steering knuckle arm.

Further, in the construction mentioned above, it may be 65 desirable that the said spindle securely fastened to the said steering knuckle arm should have a rim member supported thereon which is securely fastened with a said wheel, that an input shaft supported on the said spindle and the said rim member should be coupled to each other via a reduction gear of planetary gear type provided in the said rim member, and that the said input shaft should be coupled to the respective output shafts of the said second and third hydraulic motors.

According to the construction just mentioned above, it can be seen that the fact that the said rim member for the front wheels to which the said hydraulic motors are coupled independently of each other is internally provided with the said reduction gear of planetary gear type will therein incorporate the said reduction gear, without enlarging the hub portions of the said front wheels.

Further, in the construction mentioned above, it may be desirable that the respective output shafts of the said second and third hydraulic motors and an input shaft supported on a spindle securely fastened to the said steering knuckle arm should be coupled together via a clutch.

It should be noted at this point that it may be desirable that the said clutch should be of a disk plate configuration or alternatively of a coupling configuration in which a coupling is engageable with and disengageable from the said output shafts and the said input shafts.

Also, it may be desirable that a clutch of a disk plate configuration should be interposed between an intermediary rotary member that can be constituted by a ring gear or a carrier on the one hand and a wheel hub for said reduction gear on the other hand.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention, but to facilitate an explanation and understanding thereof.

In the accompanying drawings.

BEST MODES FOR CARRYING OUT THE INVENTION

Hereinafter, suitable embodiments of the present invention with respect to a traveling drive apparatus in a working vehicle will be set forth with reference to the accompanying drawings hereof.

Figure 1:
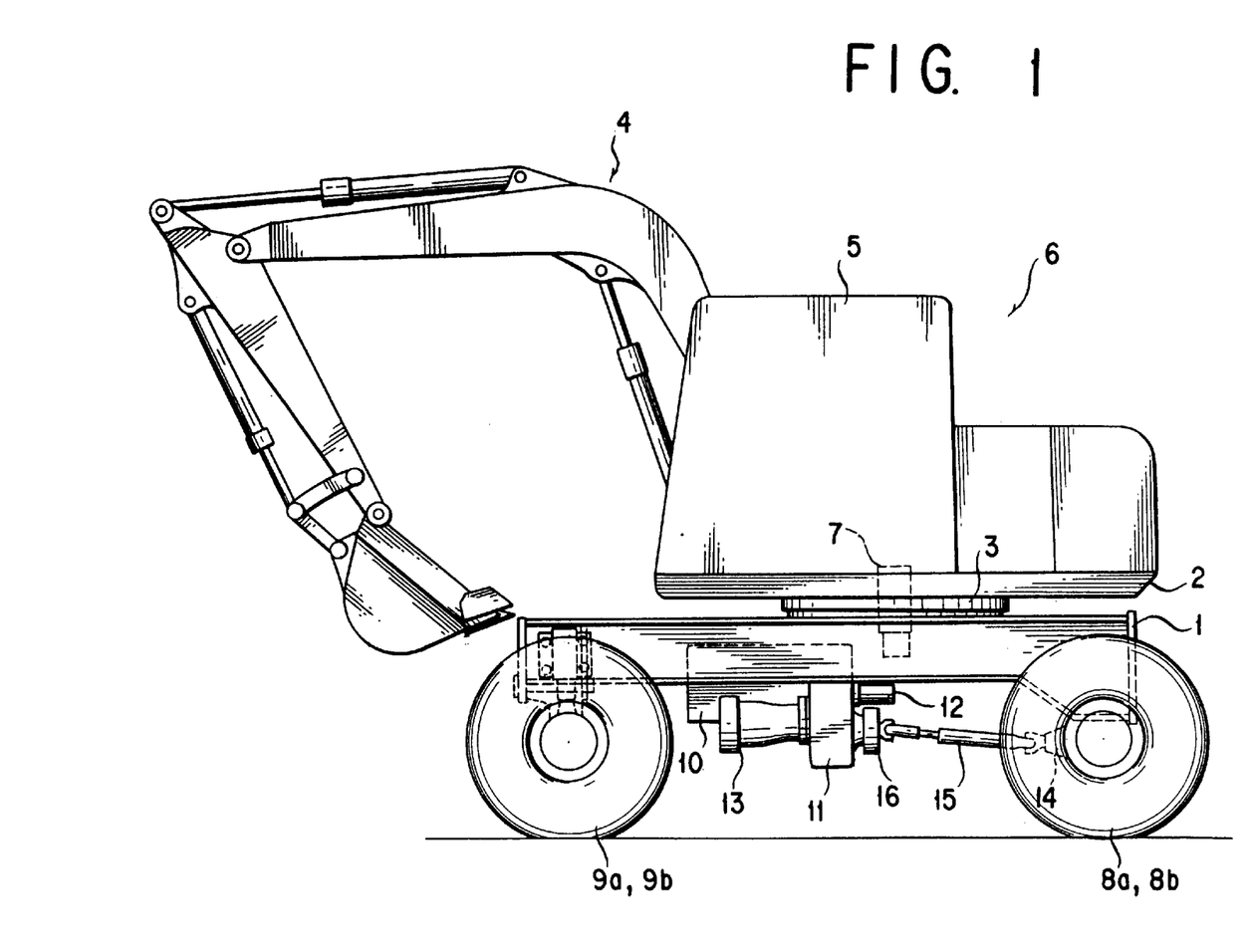
FIG. 1 is a side view diagrammatically illustrating a working vehicle that incorporates a certain embodiment of the present invention.
Figure 2:
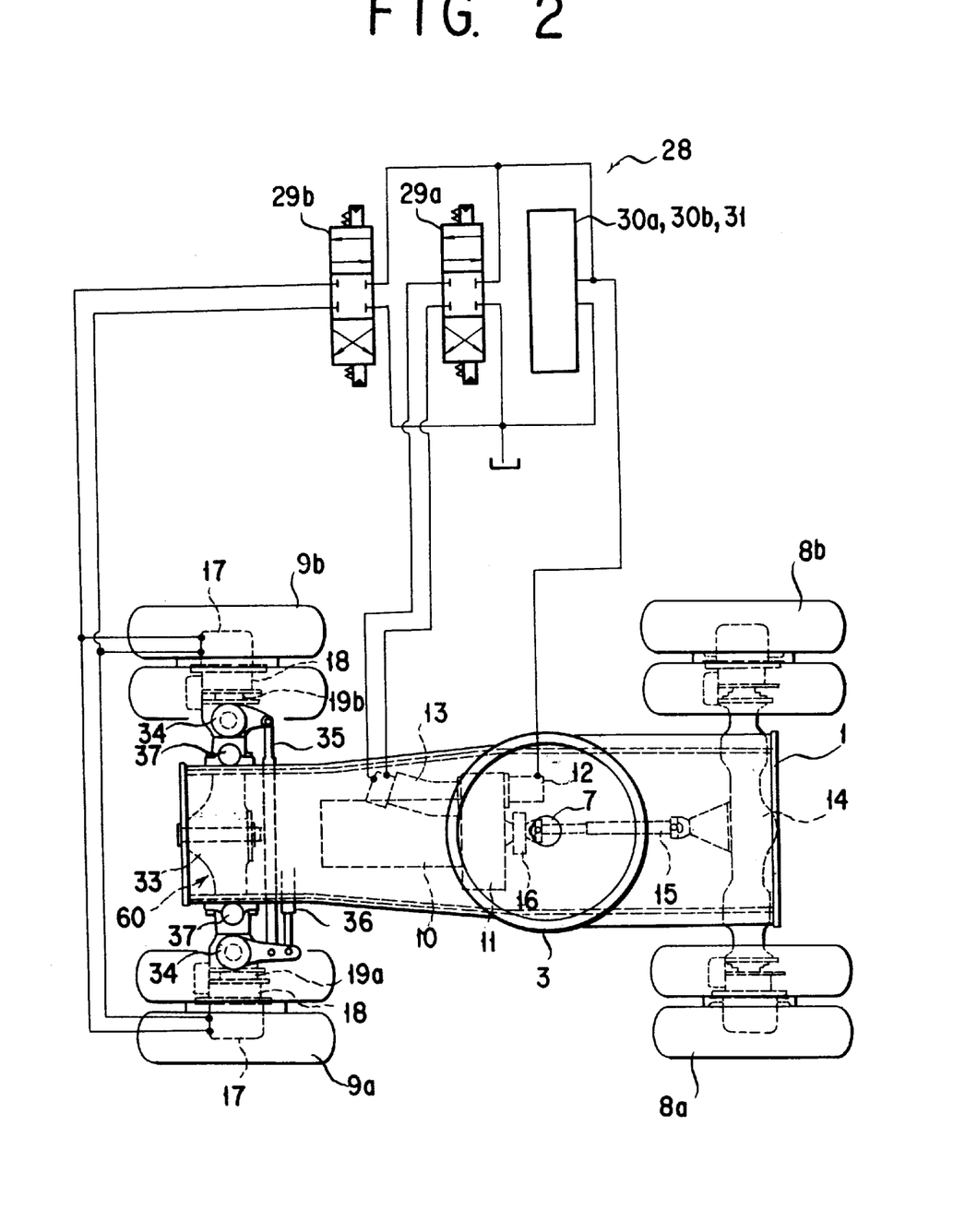
FIG. 2 is a top plan view diagrammatically illustrating the above mentioned working vehicle and the above mentioned embodiment of the present invention.

FIGS. 1 and 2 show an example of the working vehicle which incorporates an certain example of the traveling drive apparatus according to the present invention. In the Figures, there is shown a chassis 1 (i. e. a frame for a traveling body) on which a turning body 2 is mounted by a turning bearing 3 so as to be turnable as desired. The said turning body 2 has a working machine 6 mounted thereof which includes an excavating unit 4, a cabin 5 and so forth. There is also shown a central swivel joint 7 that is located between the said chassis 1 and the said turning body 2.

The said chassis 1 is provided with a left hand side and a right hand side wheel 8a and 8b on the rear side, a left hand side and a right hand side wheels 9a and 9b on the front side, an engine 10, a transmission 11, a hydraulic pump 12 and a hydraulic motor 13 for the rear wheels 8a and 8b. And, the respective wheel shafts of the left hand side and right hand side wheels 8a and 8b on the rear side are coupled to the output shaft of the said transmission 11 via a differential unit 14 and a propeller shaft 15. Also, the left hand side and right hand side wheels 9a and 9b on the front side are respectively coupled via a pair of reduction gears 17 and a pair of clutches 18 equipped in their respective wheel hubs to the respective shafts of a pair of hydraulic motors 19a and 19b which are provided independently of each other for the front wheels. Each of the said hydraulic motors 19a and 19b for the front wheels is equipped in a portion of a suspension unit which suspends the front wheels and which will be described later in detail. Also, the left hand side and right hand side rear wheel shaft and the left hand side and right hand side front wheel shaft are provided with service brakes, respectively.

Figure 3:
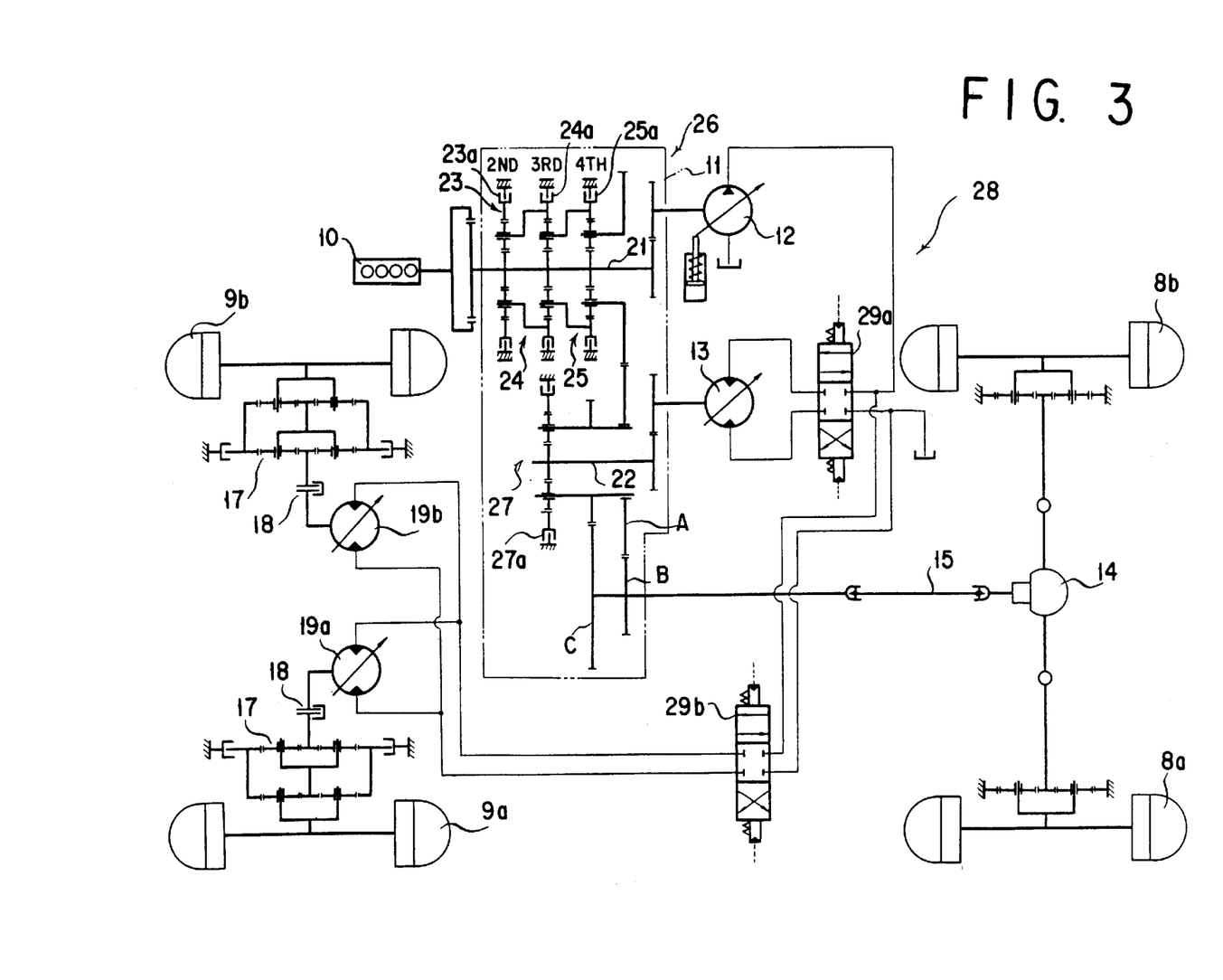
FIG. 3 is a diagrammatic view illustrating a transmission and a hydraulic circuit in the above mentioned embodiment of the present invention.

FIG. 3 shows the said transmission 11 and a hydraulic circuit 28 in the above mentioned embodiment for driving the rear wheels 8a and 8b and the front wheels 9a and 9b. The said transmission 11 is provided with a first input shaft 21 and a second input shaft 22. Here, the first input shaft 21 has one end that is connected to the output shaft of the said engine and the other end that is connected to the input shaft of the said hydraulic motor 13. And, the said first input shaft 21 is connected to a speed ratio shifting gear section 26 having a gear train 23, a gear train 24 and a gear train 25 for the second speed ratio, the third speed ratio and the fourth speed ratio, respectively, the said speed ratio shifting gear section 26 having an output side that is connected to the said propeller shaft 15 via a pair of spur gears A and B, respectively. The spur gear A is supported via a bearing on a carrier 17a of a planetary gear train 27.

Also, the said second shaft 22 has one end that is connected to the output shaft of the above mentioned hydraulic motor 13 for the rear wheels and the other end that is connected to the said propeller shaft 15 via a planetary gear train 27 and a spur gear C. The hydraulic motor 13 for the rear wheels and the hydraulic motors 19a and 19b for the front wheels mentioned above are connected to the said hydraulic pump 12 via respective control valves 29a and 29b in the said hydraulic circuit 28 of an open circuit configuration.

Figure 4:
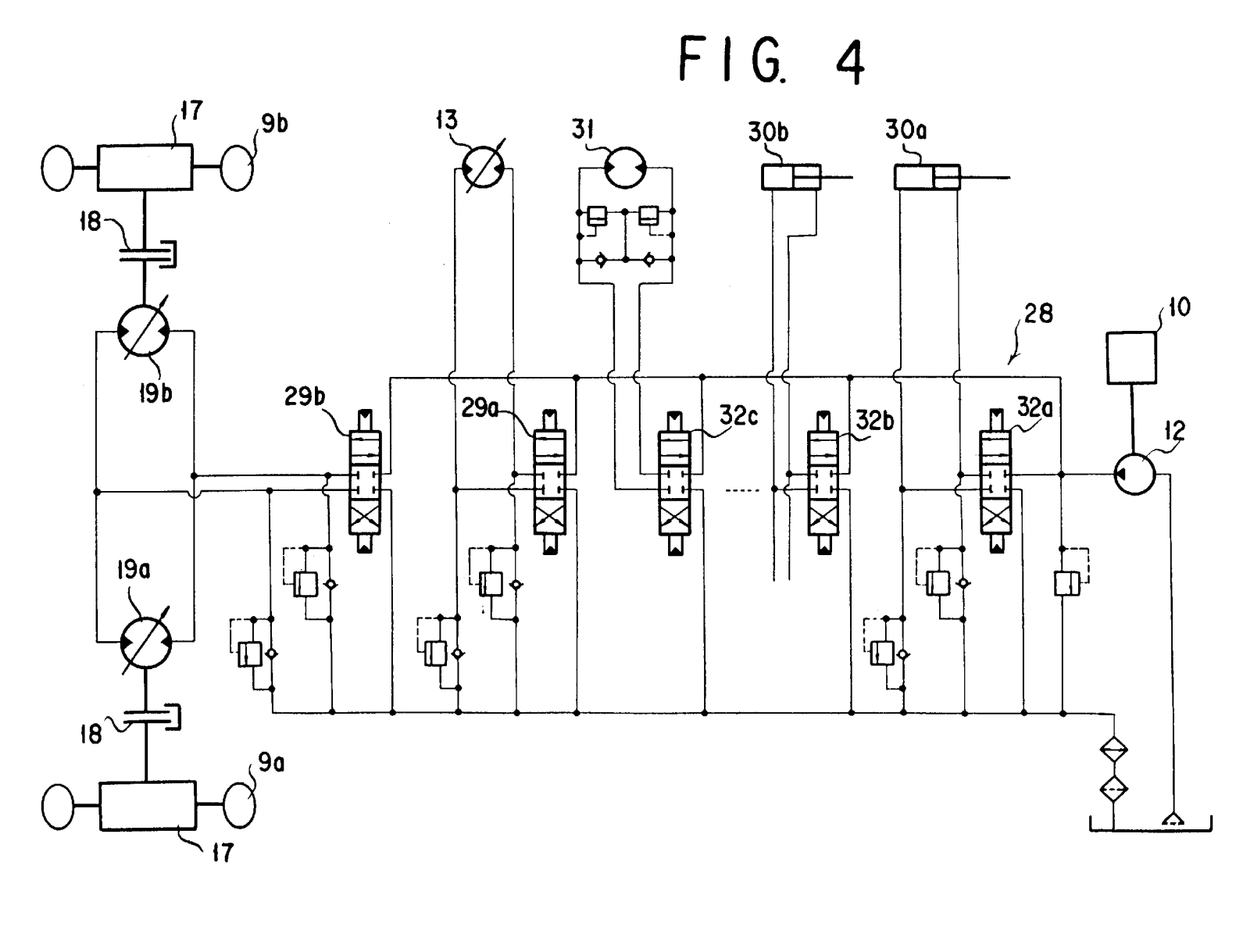
FIG. 4 is a diagrammatic view illustrating a specific example of the hydraulic circuit shown in FIG. 3.

FIG. 4 shows a specific example of the above mentioned hydraulic circuit 28. This hydraulic circuit 28 having an open circuit construction is connected to a plurality of cylinders 30a and 30b of the said excavation unit 4 in the said working machine 6 and to a turning motor 31 for driving the said upper turning body 2 via control valves 32a, 32b and 32c, respectively, and in parallel to the hydraulic motor 13 for the rear wheels and the hydraulic motors 19a and 19c for the front wheels mentioned above.

The left hand side and right hand side front wheels 9a and 9b are, as shown in FIG. 2, supported by a suspension unit of equalizer bar type. More specifically, those front wheels 9a and 9b are supported at the both ends of an equalizer bar 33 via a pair of knuckle arms 34 so as to be steering operable and are adapted to be steering operated via a steering rod 35 and a steering cylinder 36.

Also, the both ends of the said equalizer bar 33 is supported with a pair of suspension cylinders 37 having a locking mechanism. And, the above mentioned hydraulic motors 19a and 19b for driving the left hand side and right hand side front wheels 9a and 9b are supported by the above mentioned pair of knuckle arms 34.

An explanation will now be given with respect to the operation of this embodiment.

It can be seen that a rotation of the said engine 10 will cause the said first input shaft 21 of the transmission 11 to be rotated to input a speed ratio shifting gear section 26 with a power and will at the same time allow the said hydraulic pump 12 to be driven. And, the said second input shaft 22 of this transmission 11 will be input with a power from the said hydraulic motor 13 for the rear wheels which are driven with the discharge fluid from the above mentioned hydraulic pump 12. This power will be transmitted to the said propeller shaft 15 via the said planetary gear train 27 and the said spur gear C when the said clutch 27 is turned ON and will further be transmitted to the side of the rear wheels 8a and 8b to drive these rear wheels 8a and 8b.

On the other hand, the front wheels 9a and 9b will be driven by the said hydraulic motors 19 and 19a for the front wheels which motors are rotated by the discharge fluid from the above mentioned hydraulic pump 12.

And, the power for transmission to the said speed ratio shifting gear section 26 within the above mentioned transmission 11 will be transmitted to the said propeller shaft 15 via the said spur gears A and B by selectively turning ON the respective clutches 13a, 24a and 25a of the above mentioned speed ratio gear trains 23, 24 and 25.

An explanation will now be given with respect to each speed ratio that is configured by selectively using a respective one of the clutches 23a, 24a and 25b of each of the speed ratio gear trains 23, 24 and 25 in the said speed ratio shifting gear section 26 and each of the said hydraulic motors 12, 13, 19a and 19b, each for the case of backing with both the rear wheels 8a and 8b and the front wheels 9a and 9b, for the case of two wheel drive with the rear wheels 8a and 8b and for the case of four wheel drive with both the rear wheels 8a and 8b and the front wheels 9a and 9b. Table 1 listed below shows the ON/OFF states of the power from the engine 10, the power from the hydraulic motor 13 for the rear wheels and the power from the hydraulic motors 19a and 19b for the front wheels in each speed ratio for the case of backing, for the case of two wheel drive and for the case of four wheel drive.

TABLE 1

| | Backing | Two Wheel Drive | | | | Four Wheel Drive | | | |
|---|---|---|---|---|---|---|---|---|---|
| | R | 2-F$_1$ | 2-F$_2$ | 2-F$_3$ | 2-F$_4$ | 4-F$_1$ | 4-F$_2$ | 4-F$_3$ | 4-F$_4$ |
| Engine | OFF | OFF | ON | ON | ON | OFF | ON | ON | ON |
| Hydraulic Motor for the Rear Wheels | ON | ON | OFF | OFF | OFF | ON | OFF | OFF | OFF |
| Hydraulic Motor for the Front Wheels | ON | OFF | OFF | OFF | OFF | ON | ON | ON | ON |

Backing (R)

The hydraulic motor 13 for the rear wheels and the hydraulic motors for the front wheels 19a and 19b are reversely rotated controlledly so that the vehicle may be backed in a four wheel drive mode with hydraulic motors 13, 19a and 19b.

In this case, all of the clutches in the speed ratio shifting gear section 26 except for the clutch 27a of planetary gear train will be held off. This will disable (hold OFF) a transmission of the power from the engine 10 via the speed ratio shifting gear section 26. The output of the hydraulic motor 13 for the rear wheels will then be input to the propeller shaft 15 via the planetary gear train 27 and the spur gear C.

Two Wheel Drive/First Speed Ratio Advance (2-F1)

Only the hydraulic motor for the rear wheels will be positively rotated controlledly (ON) and thereafter the rear wheels 8a and 8b will be driven by the hydraulic motor 13 for the rear wheels. In this case, a transmission of the power from the engine will be disabled or held OFF as in the above mentioned backing case while a transmission of the power from the hydraulic motors 19a and 19b for the front wheels will also be disabled or held OFF.

Two Wheel Drive/Second Speed Ratio Advance (2-F2)

A transmission of the power from the hydraulic motor 13 for the rear wheels and the hydraulic motors 19a and 19b for the front wheels will be disabled or held OFF while the power of the engine 10 will be transmitted by the spur gears A and B by holding ON the clutch 23a in the speed ratio gear train 23 for the two speed ratios in the speed ratio sifting gear section 26 to drive the rear wheels 8a and 8b. The planetary gear train 27 of the second input shaft 22 will then be held OFF.

Two Wheel Drive/Third Speed Ratio Advance (2-F3), Two Wheel Drive/Fourth Speed Ratio Advance (2-F4)

For each of the respective speed ratio controls, a transmission of the power from each of the hydraulic motors 13, 19a and 19b will be disabled or held OFF and each of the respective clutches 24a and 25b of the three speed stepped gear train 24 and the four speed ratio gear train 25 will be held ON to allow the power of the engine 10 to be transmitted by the spur gears A and B, thereby driving the rear wheels 8a and 8b. In this case, the clutch 27a of the planetary gear train 27 will be held OFF.

Four Wheel Drive/First Speed Ratio Advance (4-F1)

The hydraulic motor 13 for the rear wheels and the hydraulic motors 19a and 19b for the front wheels will each be positively rotated controlledly to drive the wheels 8a and 8b and 9a and 9b with those hydraulic motors 13, 19a and 19b. This is similar to the case in which the vehicle is backed and will allow it to travel at an increased force of traction. The power from the engine 10 will then be held OFF.

Four Wheel Drive/Second Speed Ratio Advance (4-F2)

The clutch 23a of the second speed ratio gear train 23 in the speed ratio shifting gear section 26 will be held ON to transmit the power from the engine 10, thereby driving the rear wheels 8a and 8b. Also, a transmission of the power from the hydraulic motors 19a and 19b for the front wheels will be enabled or held ON to drive the front wheels 9a and 9b. A transmission of the power from the hydraulic motor 13 for the rear wheels will then be disabled or held OFF.

Four Wheel Drive/Third Speed Ratio Advance (4-F3), Four Wheel Drive/Fourth Speed Ratio Advance (4-F4)

For each of the respective speed ratio controls, a transmission of the power from each of the hydraulic motors 19a and 19b will be enabled or held ON. Each of the respective clutches 24a and 25a of the third speed ratio gear train 24 and the fourth speed ratio gear train 25 in the speed ratio shifting gear section 26 will be enabled or held ON. The rear wheels 8a and 8b for each of the third speed ratio and fourth speed ratio control modes will thereby be driven at a respective change gear ratio in the speed ratio shifting gear section 26 by the power from the engine 10 while the front wheels 9a and 9b will be driven by the hydraulic motors 19a and 19b. A transmission of the power from the hydraulic motor 13 for the rear wheels will then be disabled or held OFF.

Figure 5:
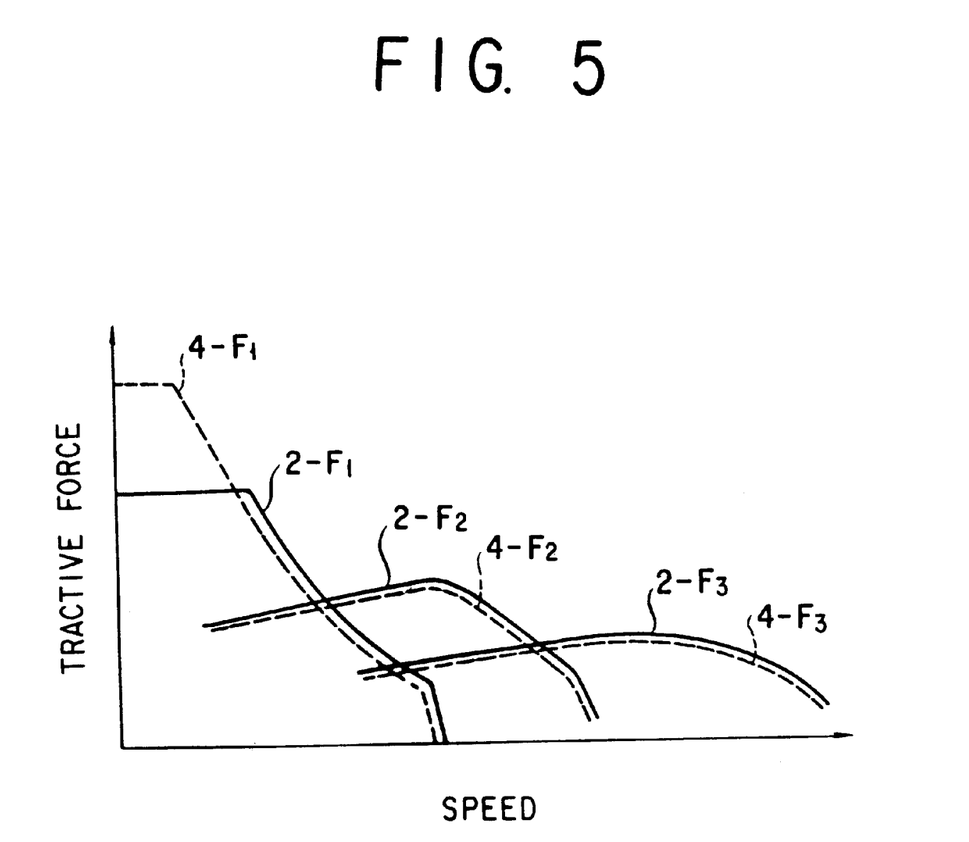
FIG. 5 is a graph diagrammatically illustrating the relationship between the speed and the tractive force in each speed ratio in the above mentioned embodiment.

While an explanation has been given in the foregoing with respect to each speed ratio in the present embodiment of this invention, the relationship between the tractive force and the speed in each of the speed ratios (the first speed ratio to third speed ratio) that will then ensue is shown in FIG. 5.

It can be seen that the the hydraulic motors 13, 19a and 19b will each follow the relationship: torque=capacity×pressure×constant and thus that as the capacity (cc/rev) of a motor is increased, the speed of rotation of the motor will be reduced and the torque (i. e. the tractive force) of the motor will be increased (assuming that the rate of flow of the fluid and its pressure are both set as constant).

In the four wheel drive mode mentioned above, it should be noted that the front wheels 9a and 9b can be selectively turned ON and OFF in their driving by turning their respective clutches 18 which are equipped around their shafts, respectively. Also, with each of the hydraulic motors 13, 19a and 19b being of a variable capacity type, they can be controlled so that each of them may have a speed of rotation selected in accordance with each speed ratio. It should be noted, however, that each of these hydraulic motors may be of a fixed capacity type.

It should still be noted at this point that the said working machines on the turning body 2 can be operated by controlling the said cylinders 30a and 30b for the working machines and the said turning motor 31 on the upper turning body via the said respective control valves 32a, 32b and 32c for the working machines. A pressurized fluid to each of the said actuators will then be supplied from the above mentioned hydraulic pump 12 for traveling. Thus, the said hydraulic pump 12 are designed to serve to achieve the both purposes of traveling and working. Accordingly, each of the above mentioned working machine components can be operated while they are traveling with the vehicle.

An explanation will next be given with respect to a first alternative example of the suspension unit for the front wheels 9a and 9b, in which its equalizer bar type shown in FIG. 2 and mentioned above is substituted by a McPherson type therefor.

Figure 6:
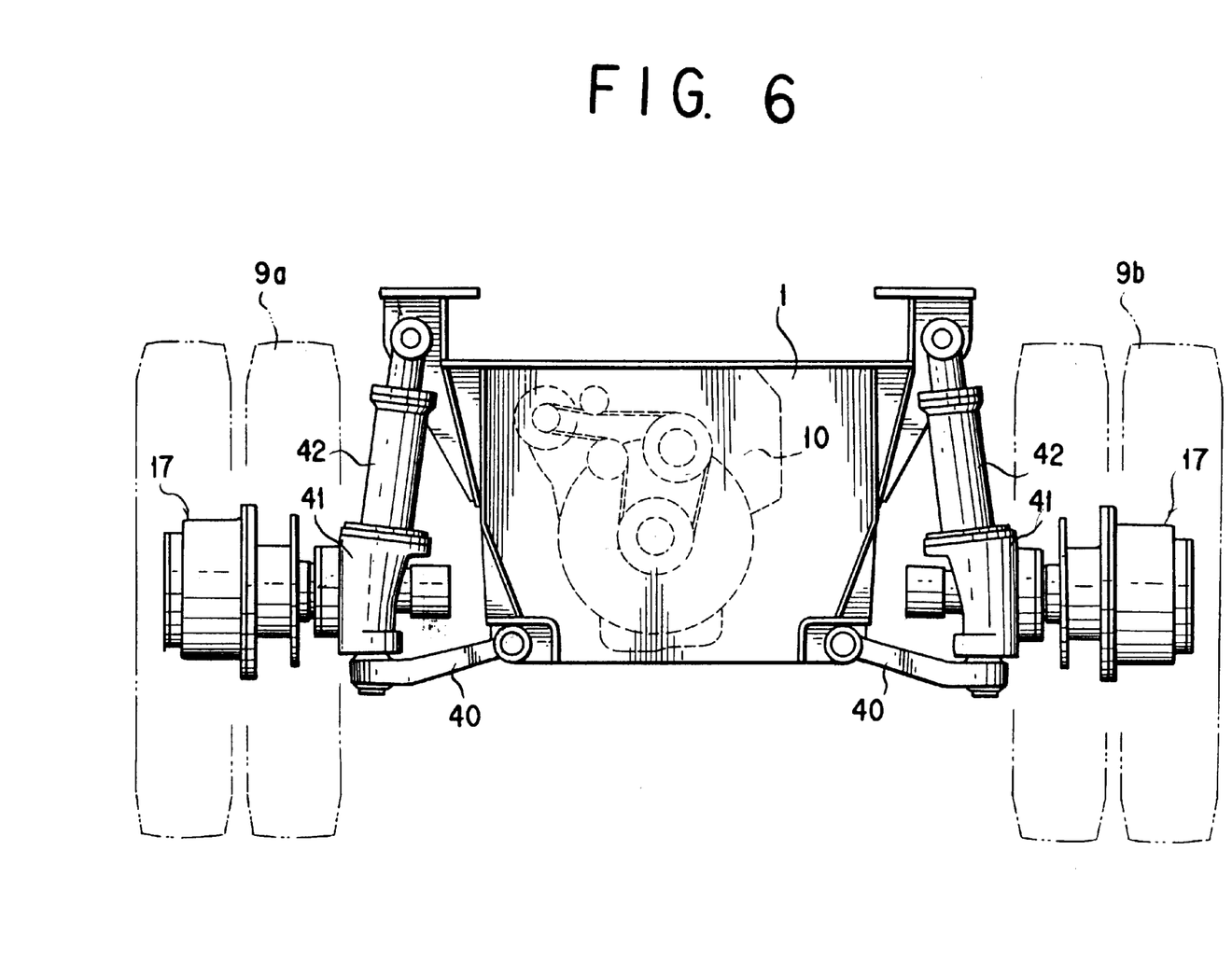
FIG. 6 is front view, partly cut away, illustrating diagrammatically a first alternative example of a suspension unit for the front wheels.
Figure 7:
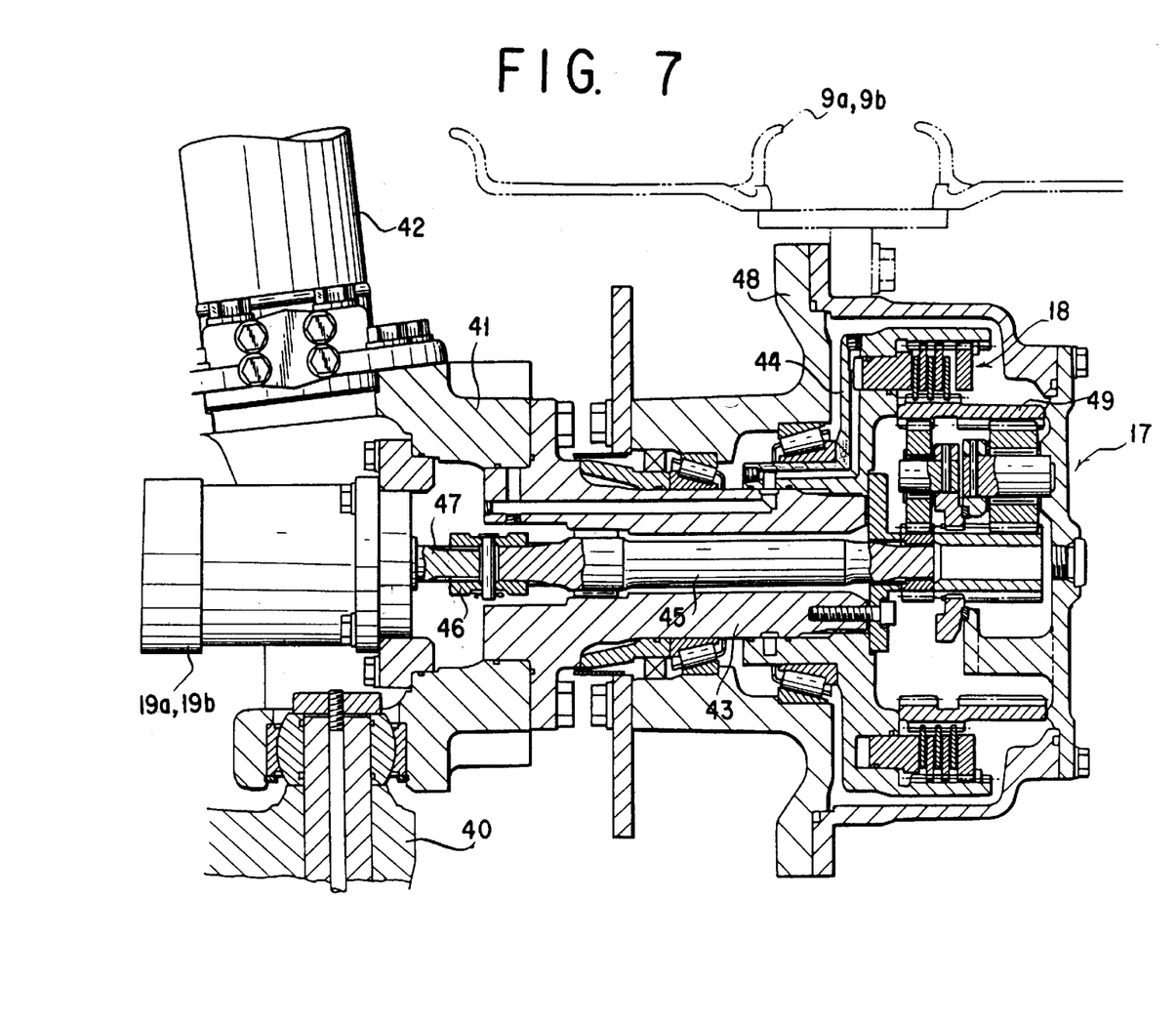
FIG. 7 is an enlarged cross sectional view, partly cut away, diagrammatically illustrating the first alternative example of the above mentioned suspension unit for the front wheels.

As shown in FIGS. 6 and 7, a pair of suspension links 40 are coupled to the both sides of the said chassis 1, respectively, so as to be turnable upwards and downwards. Each of the said suspension links 40 has at its forward end a steering knuckle arm coupled thereto and also has the lower end of a suspension cylinder 42 coupled to the steering knuckle arm, whose upper end is coupled to the said chassis 1. Also, these steering knuckle arms 41 are connected to the front wheels 9a and 9b, respectively.

An explanation in detail will now be given with respect to a portion at which a said steering knuckle arm 41 is connected to a said front wheel 9a, 9b that corresponds thereto, with reference being had to FIG. 7.

A spindle 43 has its one end that is securely fastened to the said steering knuckle arm 41 and its other end that is securely fastened to a wheel hub 44. On the other hand, the above mentioned spindle 43 has its axial portion at which an input shaft 45 is supported so as to be freely rotatable. The input shaft 45 has its one end that is connected to each of the respective output shafts 47 of the said hydraulic motors 19a and 19b for the front wheels which motors are coupled to the above mentioned steering knuckle arm 41 via a coupling 46.

A rim member 48 for a said front wheel 9a, 9b is supported on the above mentioned wheel hub 44 so as to be freely rotatable. The said rim member 48 and the forward end of the above mentioned spindle 43 are coupled together via a reduction gear 17 of planetary gear construction. And, a clutch 18 for coupling and decoupling the said reduction gear 17 is provided in the inner periphery of the said wheel hub 44. The said clutch 18 is configured between the said inner periphery of the wheel hub 44 and the outer periphery of a ring gear member 49 of the said reduction gear 17 so that the said ring gear member 49 may selectively be fixed to the wheel hub 44 or may alternatively be freely rotatable.

Figure 8:
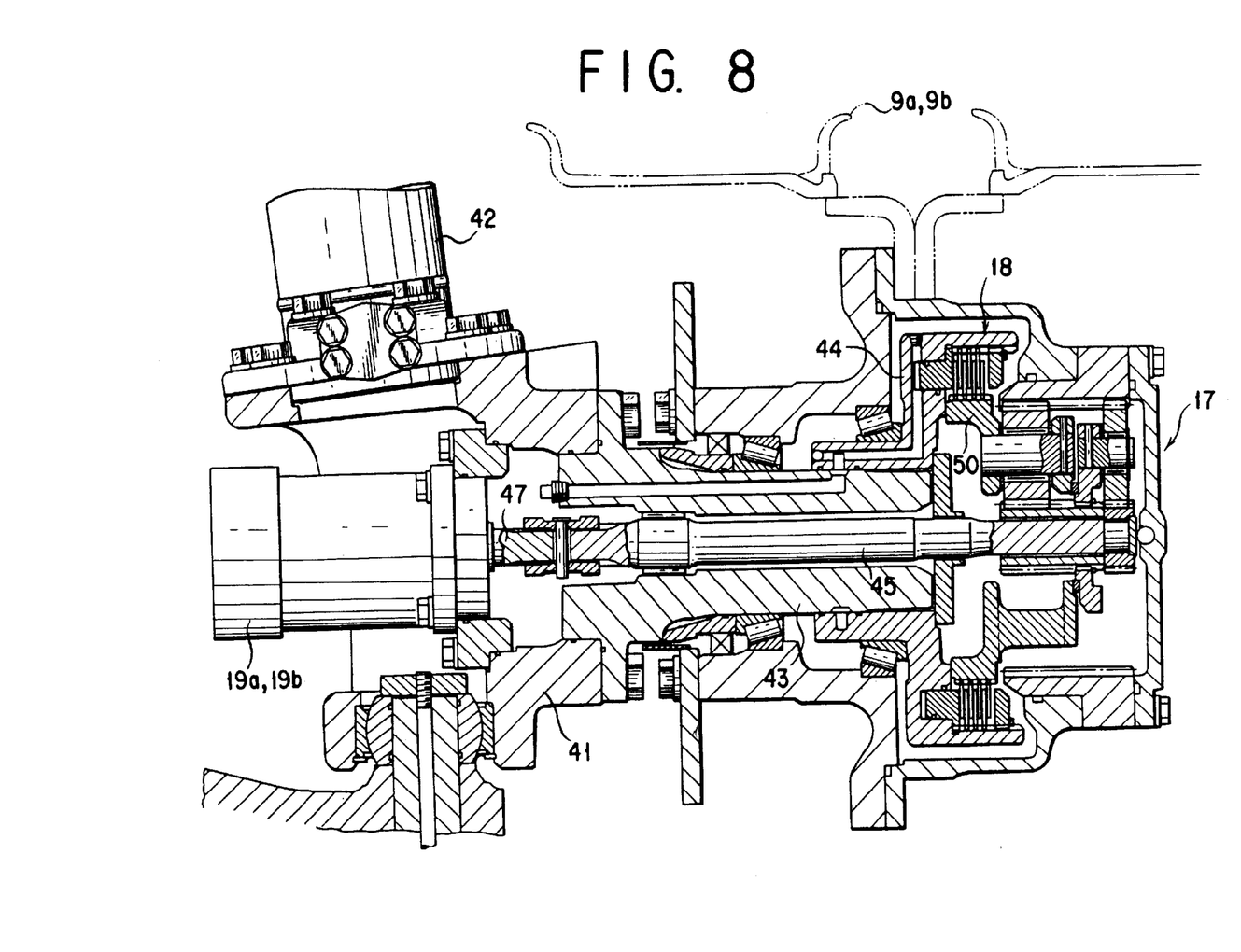
FIG. 8 is an enlarged cross sectional view, partly cut away, diagrammatically illustrating a second alternative example of the suspension unit for the front wheels.

FIG. 8 shows the construction of a second alternative example of the said suspension unit for the front wheels 9a and 9b. In this example, the said clutch 18 is configured between the inner periphery of the said wheel hub 44 and a carrier 50 of the said reduction gear 17 so that the said carrier 50 may selectively be fixed to the wheel hub 44 or may alternatively be freely rotatable.

Figure 9:
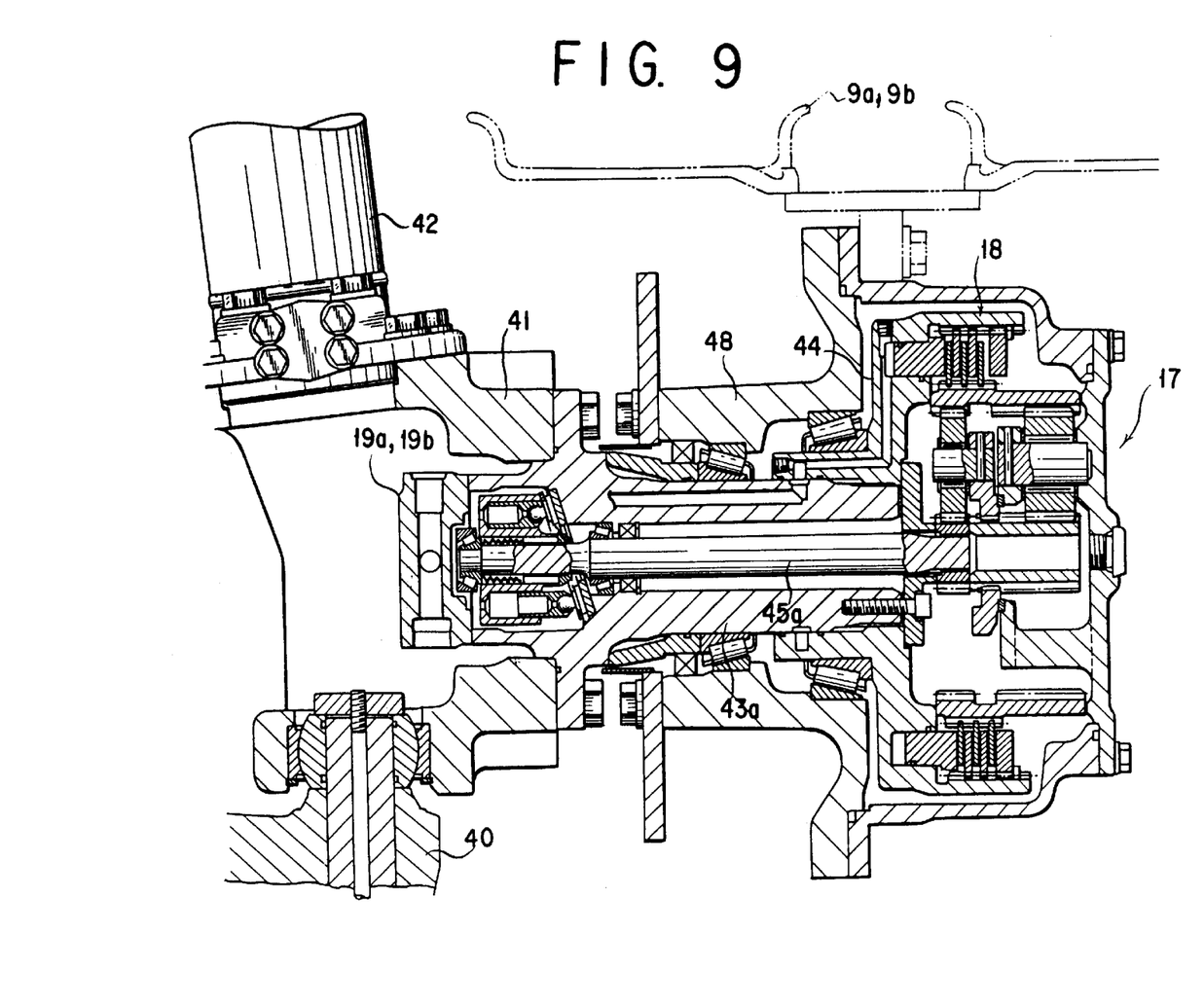
FIG. 9 is an enlarged cross sectional view, partly cut away, diagrammatically illustrating a third alternative example of the suspension unit for the front wheels.

FIG. 9 shows a third alternative example of the said suspension unit for the front wheels 9a and 9b, in which the supporting structure for the said hydraulic motors 19a and 19b for the front wheels are different from one in the examples mentioned above. In this example, a spindle 43a has a housing portion of the hydraulic motors 19a and 19b for the front wheels constructed integrally therewith, the respective output shafts of which motors are made integral with an input shaft 45a that is supported by the above mentioned spindle 43a.

According to this construction, it will be seen that since the said hydraulic motors 19a and 19b for the front wheels are largely projected into the interior of the said steering knuckle arm 41, those hydraulic motors 19a and 19b can completely be protected with the steering knuckle arm 41. Also, since the hydraulic motors 19a and 19b for the front wheels 19a and 19b are made integral with the said spindle 45a, it is possible to make this portion in a compact construction.

Figure 10:
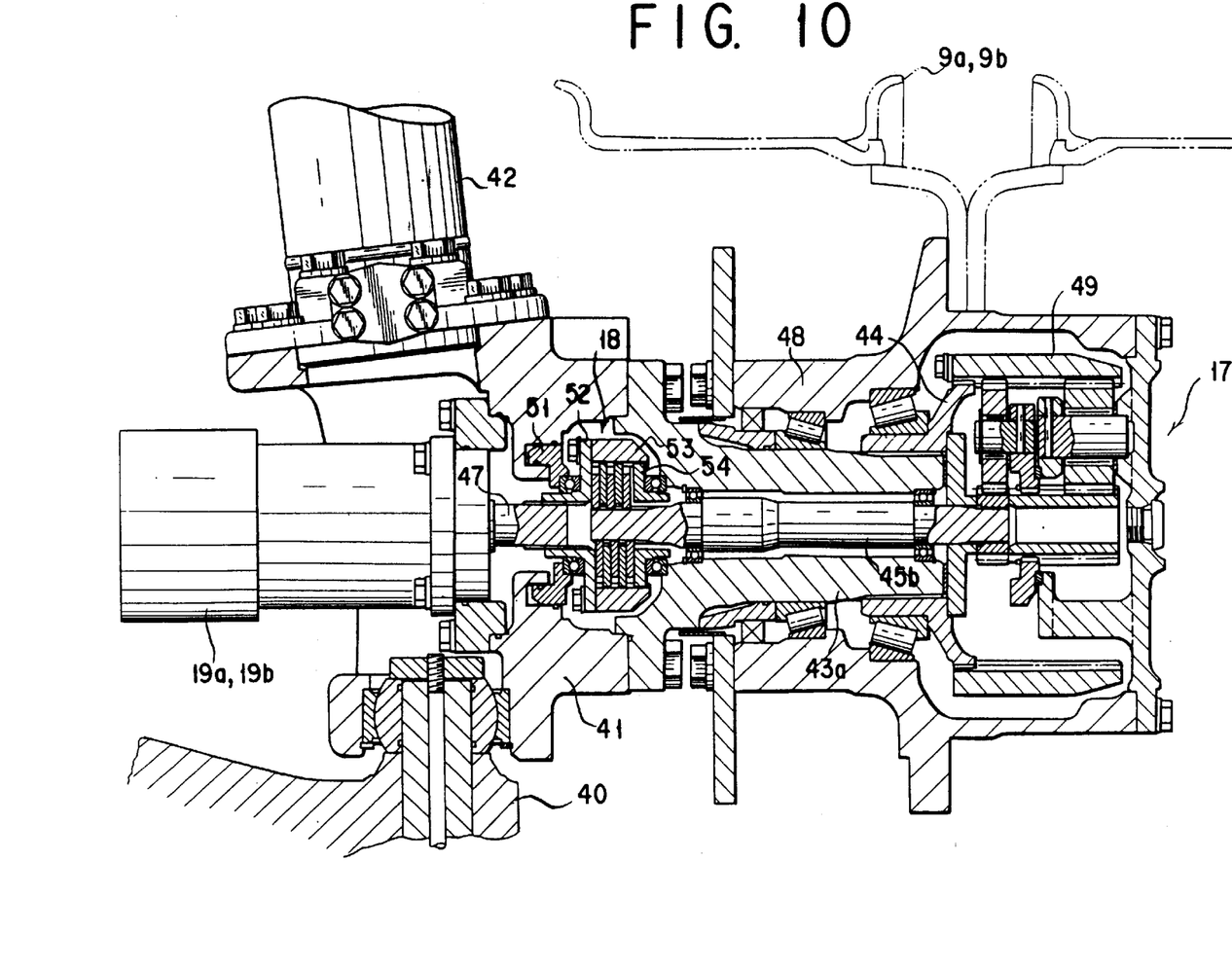
FIG. 10 is an enlarged cross sectional view, partly cut away, diagrammatically illustrating a fourth alternative example of the suspension unit for the front wheels.

FIG. 10 shows a fourth alternative example of the said suspension unit for the front wheels 9a and 9b, in which the mounting site of the above mentioned clutch 18 is different.

In this example, the said ring gear member 49 of the reduction gear 17 is securely fastened to the said wheel hub 44 whereas an input shaft 45b and the said rim member 48 are coupled together via the said reduction gear 17. And, the said clutch 18 is mounted between the said input shaft 45b and the respective output shafts 47 of the said hydraulic motors 19a and 19b.

According to this construction, owing to the fact that the size of the said reduction gear 17 in its radial direction can be reduced by the size of the said clutch 18, it is possible to make the hub portions of the front wheels 9a and 9b small sized. Also, it is also possible to reduce the said clutch 18 itself in both its size and its cost.

An explanation will now be given below with respect the construction of a said clutch 18 as shown in FIG. 10.

An operative piston 51 is provided at the side of the said steering knuckle arm 41 and a coupling 52 operative to be pushed by the said piston 51 is slidably engageable with a said output shaft 47 in its axial direction. And, a plurality of disk plates are provided between the inner periphery of a cylindrical member 53 securely fastened to the said coupling 52 and the outer periphery of the said input shaft 45 so as to be brought into an alternate contact therewith. A back plate 54 arranged to oppose to the above mentioned coupling 52 is supported by the said spindle 43a so as to be freely rotatable.

And, by allowing the said operative piston 51 to be pushed with a hydraulic force, the said coupling 52 will be pushed toward the side of the said back plate 54 to cause the said plurality of disk plates to be contacted with one another under pressure, thereby connecting the said coupling 52 and the said input shaft 45 together.

In a construction of the said clutch as shown in FIG. 10, it is possible for this clutch 18 to be compactly interposed between the said respective output shafts 47 of the hydraulic motors 19a and 19b for the front wheels and the said input shaft 45b for the front wheels 9a and 9b.

Figure 11:
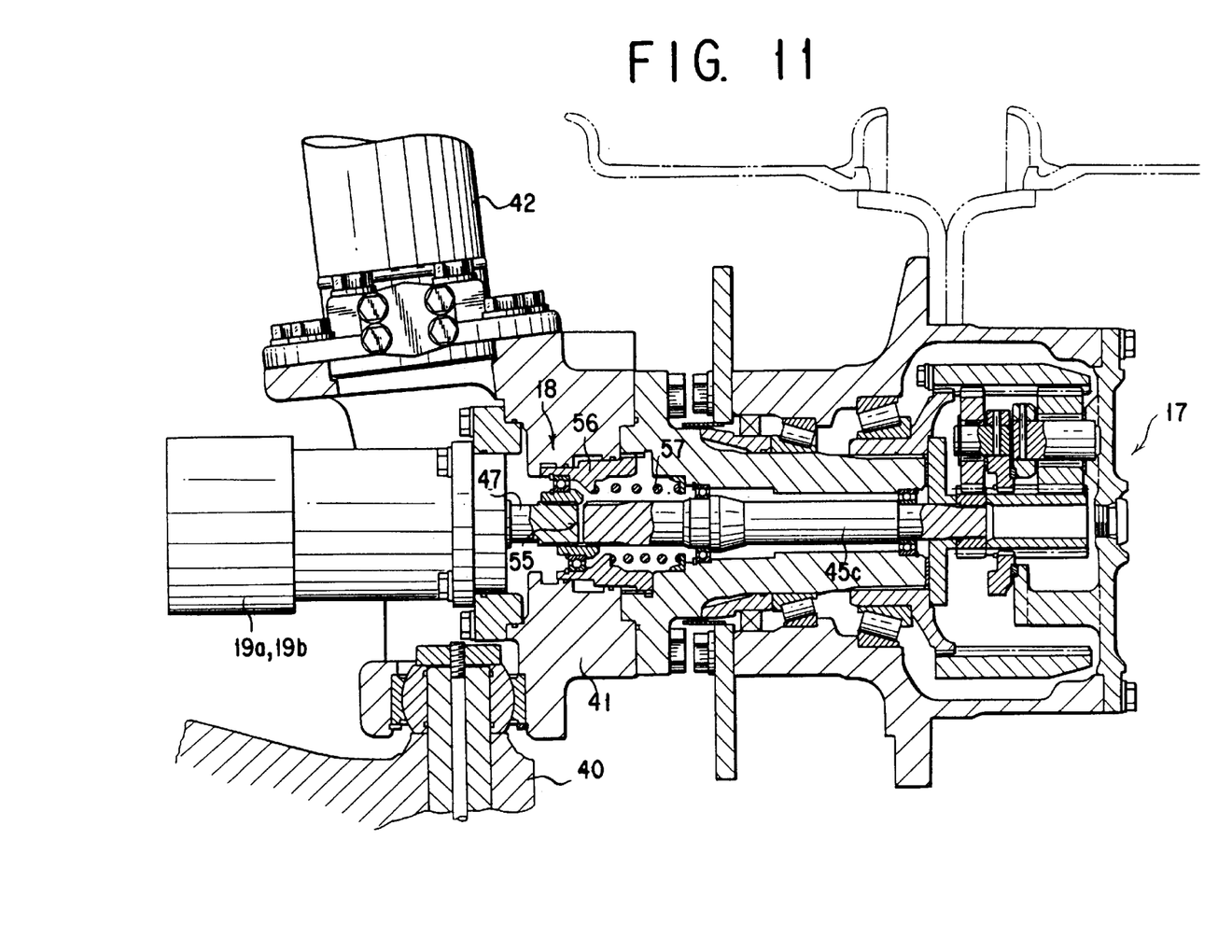
FIG. 11 is an enlarged cross sectional view, partly cut away, diagrammatically illustrating a fifth alternative example of the suspension unit for the front wheels.

FIG. 11 shows a fifth alternative example of the said suspension unit for the front wheels 9a and 9b, in which the construction of the said clutch 18 is further modified. In this example, the respective output shafts 47 of the hydraulic motors for the front wheels 19a and 19b and respective input shafts 45c for the front wheels 9a and 9b are adapted to be disengaged from one another by a sliding movement of a coupling 55. This coupling 55 is designed to be sudden by a piston 56 that is disposed in the said steering knuckle arm 41 and that is adapted to be returned by a spring 57 and also to be slidden in its engagement direction by a hydraulic force. In FIG. 11, it should be noted that the position in which they are disengaged by the coupling 55 and the position in which they are engaged by the coupling 55 are shown above and below the center line of a said input shaft 45c and a said output shaft 47.

According to the construction adopted in this example, it can be seen that owing to the fact that the function of the said clutch 18 is performed by the sliding movement of the said coupling 55, the structure is here much simplified and the cost involved is here much reduced as compared with the preceding example in which the clutch 18 is composed of a plurality of disk plates.

Figure 12:
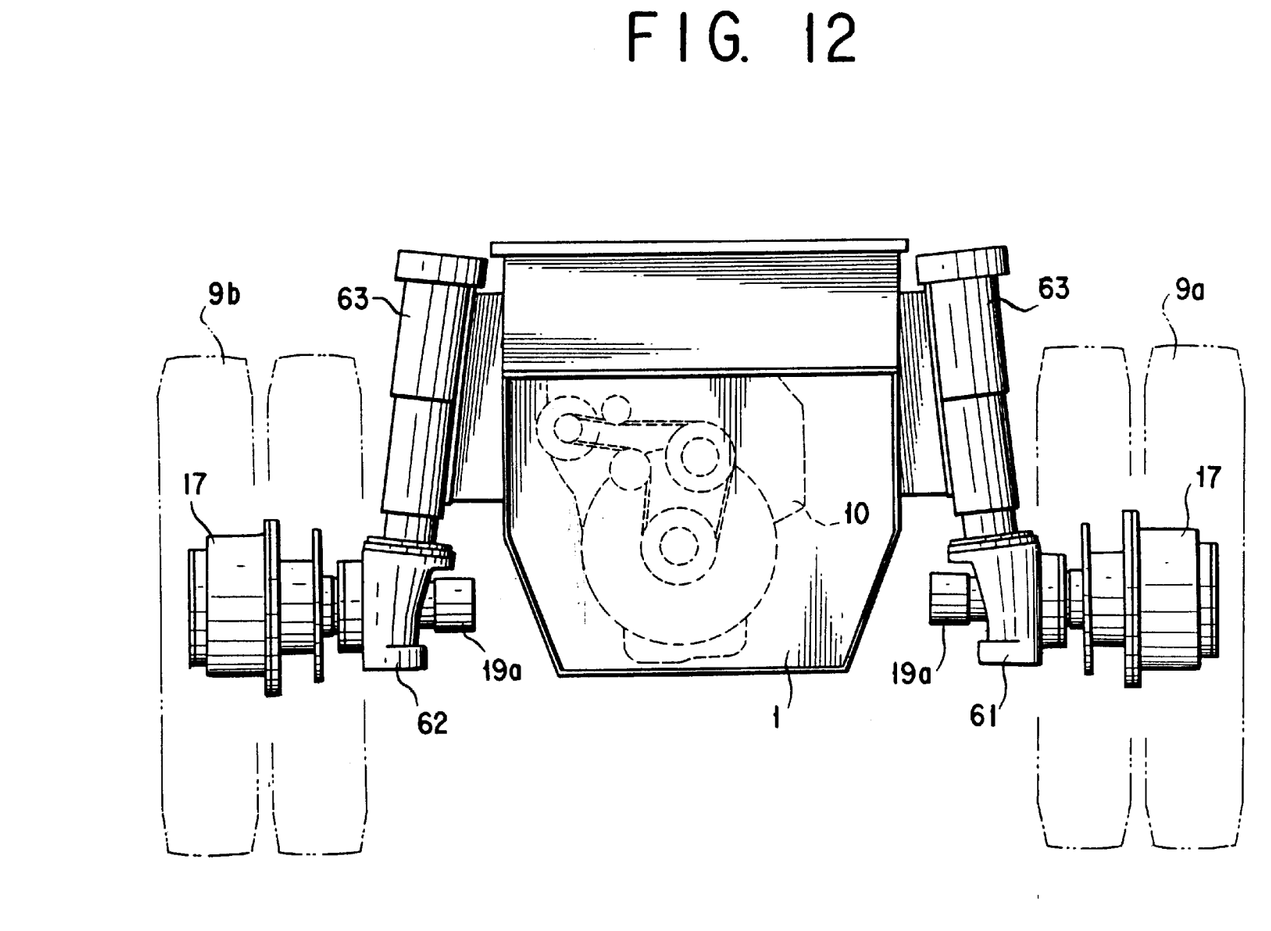
FIG. 12 is an enlarged cross sectional view, partly cut away, diagrammatically illustrating a sixth alternative example of the suspension unit for the front wheels.

Each construction as mentioned above of the said suspension unit for the wheels 9a and 9b needs not necessarily to be of McPherson type and may similarly be served by a suspension unit 60 of equalizer bar type as shown in FIG. 2 or alternatively a suspension unit 61 of sliding pillar type as shown in FIG. 12.

In a suspension unit of sliding pillar type as shown in FIG. 12, a pair of steering knuckle arms 62 are each supported at the forward end of a suspension cylinder 63 so as to be freely rotatable and have each in its interior a said hydraulic motor 19a, 19b that is disposed for a said front wheel.

While the present invention has hereinbefore been described with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all equivalents thereof.

What is claimed is:

1. A traveling drive apparatus in a working vehicle, comprising a traveling body with front wheels and rear wheels which are adapted to be driven respectively in a controlled manner and a turning body mounted to the traveling body, an engine and a transmission being mounted to said traveling body, and said engine being provided at either one side of the front and rear wheels, wherein the transmission includes a pump means and a first hydraulic motor and an output shaft of the transmission is coupled to one side of the front and rear wheels at which the engine is not provided in a manner that the transmission is operatively connected to the first hydraulic motor in an operation starting time and is operatively connected to an output side of the engine in a high speed traveling operation, and wherein second and third hydraulic motors are provided for another one side of the front and rear wheels at which the engine is provided and coupled to the another one side of the wheels through speed reduction mechanisms, and clutches are further provided for suspension units so as to perform connecting and disconnecting operations of the second and third hydraulic motors to the wheels through the speed reduction mechanisms.

2. A traveling drive apparatus according to claim 1, wherein said pump means has an intake side connected to a tank side and a discharge side on which an actuator means for a working machine, an actuator for turning the turning body and said first, second and third hydraulic motors are connected in parallel through operating valve means.

3. A traveling drive apparatus according to claim 2, wherein said second and third hydraulic motors are disposed in interiors of steering knuckles of the suspension units.

4. A traveling drive apparatus in a working vehicle, as set forth in claim 1, wherein said first hydraulic motor and said second and third hydraulic motors are connected in parallel to one another with a discharge side circuit of said hydraulic pump via an operating valve means.

5. A traveling drive apparatus in a working vehicle, as set forth in claim 1, wherein said suspension unit for said left hand side wheel and said right hand side wheel on said front side has said second hydraulic motor and said third hydraulic motor respectively provided independently of each other; and each of said second and third hydraulic motors is disposed in the interior of a steering knuckle arm of a said suspension arm.

6. A traveling drive apparatus in a working vehicle, as set forth in claim 5, wherein said second and third hydraulic motors are constructed integrally with a spindle which is securely fastened to a said steering knuckle arm.

7. A traveling drive apparatus in a working vehicle, as set forth in claim 5, wherein said spindle securely fastened to said steering knuckle arm has a rim member supported thereon which is securely fastened with a said wheel; an input shaft supported on said spindle and said rim member are coupled to each other via a reduction gear of planetary gear type provided in said rim member; and said input shaft is coupled to the respective output shafts of said second and third hydraulic motors.

8. A traveling drive apparatus in a working vehicle, as set forth in claim 5, wherein the respective output shafts of said second and third hydraulic motors and an input shaft supported on a spindle securely fastened to said steering knuckle arm are coupled together via a clutch.

9. A traveling drive apparatus in a working vehicle, as set forth in claim 8, wherein said clutch is of a disk plate configuration.

10. A traveling drive apparatus in a working vehicle, as set forth in claim 8, wherein said clutch is of a coupling configuration in which a coupling is engageable with and disengageable from said output shafts and said input shaft.

11. A traveling drive apparatus in a working vehicle, as set forth in claim 7, wherein a clutch of a disk plate configuration is interposed between an intermediary rotary member and a wheel hub for said reduction gear.

12. A traveling drive apparatus in a working vehicle, as set forth in claim 11, wherein said intermediary rotary member is constituted by a ring gear.

13. A traveling drive apparatus in a working vehicle, as set forth in claim 11, wherein said intermediary member is constituted by a carrier.

* * * * *